July 13, 1954  E. R. PRICE  2,683,352
TILTING VALVE MASTER CYLINDER FOR HYDRAULIC BRAKE SYSTEMS
Filed Aug. 29, 1949
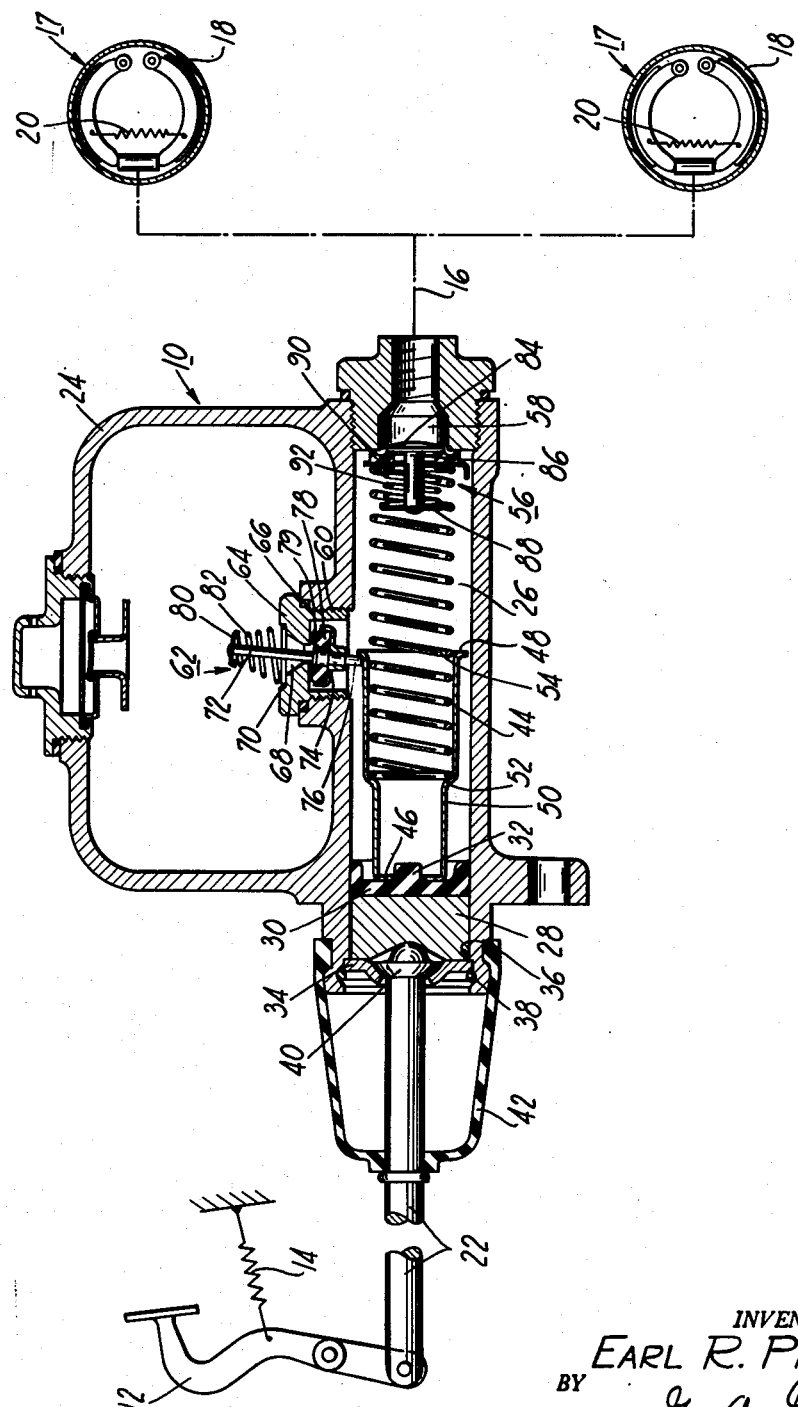
INVENTOR.
EARL R. PRICE
BY
ATTORNEY Patented July 13, 1954

2,683,352

UNITED STATES PATENT OFFICE 2,683,352

TILTING VALVE MASTER CYLINDER FOR HYDRAULIC BRAKE SYSTEMS

Earl R. Price, South Bend, Ind., assignor to Bendix Aviation Corporation, South Bend, Ind., a corporation of Delaware Application August 29, 1949, Serial No. 112,881

10 Claims. (Cl. 60—54.6)

1

The present invention relates to improvements in fluid pressure producing devices for fluid pressure operated systems, and is particularly concerned with master cylinders for hydraulic braking systems. Application Serial No. 110,816, filed on August 17, 1949, by Earl R. Price, but now abandoned, discloses one feature of the present invention.

An object of the present invention is to provide an improved one-way check valve device to control the flow of fluid between a master cylinder and its compensating reservoir. Use of my improved check valve device eliminates the need for the conventional "uncovered port," and thus removes the possibility of master cylinder failure due to scuffing of the sealing cup as it passes over the port. The check valve device which is disclosed herein has a stem coaxial with its seating portion and perpendicular to the axis of the master cylinder; and the valve is arranged to have a "tilting" movement when urged away from its seat.

A further, and more specific, object of the present invention is to provide a tiltable check valve device which will not bind or stick in its opened, or tilted, position. In previously suggested tiltable check valves, the valve member has been peripherally guided in a recess surrounding the port to be controlled. This guiding is necessary to keep the valve centered over the port for effective sealing. A difficulty has been encountered due to the tendency of the valve member to cock or tilt and become wedged between the guiding wall of the recess and one side of the valve seat, thereby permanently opening the high pressure side of the system to atmospheric pressure, resulting in absolute failure of the system. The present invention embodies a construction which obviates this difficulty.

Other objects and advantages ancillary to those stated above will become apparent as the description proceeds.

The drawing is a diagrammatic view of a hydraulic brake system incorporating an embodiment of the present invention illustrated in section.

Referring more particularly to the drawing, a hydraulic brake system is shown comprising a master cylinder assembly 10 operated by a lever, or brake pedal 12 biased to retracted position by a tension spring 14. Conduit 16 connects the discharge end of the master cylinder to the wheel cylinders 17 of brakes 18, provided with return springs 20. Brake pedal 12 is pivotally connected to piston rod 22, the other end of which has an abutting connection with the master cylinder piston, permitting the spring 14 to retract the pedal 12 and piston rod 22 independently of the master cylinder piston.

The master cylinder assembly 10 may comprise a single casting divided into two main portions, the reservoir 24 and the pressure chamber 26. An apertured bracket, or flange, forms a convenient means for attaching the casting to the frame, or other suitable part, of an automotive vehicle. A piston 28 is reciprocably mounted in pressure chamber 26 and is provided on its pressure generating face with a cup-shaped sealing member 30, which may have a centrally projecting guide boss 32.

Rearward movement of piston 28 is stopped by means of the annular stop member 34 held, by means of a resilient retaining ring 38, against a shoulder 36 formed in the rear end of the master cylinder. The piston rod 22, which projects through the opening in stop member 34, is formed with an enlarged piston-engaging-end 40 which abuts against said stop member 34 in its fully retracted position. A rubber boot 42 is fitted around the rear end of the piston rod assembly to keep it clear of foreign matter, such as dust and moisture.

A tubular member 44 is provided on one end with an inwardly turned flange portion 46 snugly embracing boss 32 of sealing cup 30 and on the other end with an outwardly turned valve controlling flange 48. This tubular member 44 is further provided with a reduced diameter end portion 50, which forms a spring-retaining shoulder 52. A piston return spring 54 is compressed between this shoulder 52 and a residual pressure valve assembly 56, which covers the discharge port 58 of the pressure chamber 26. Thus piston 28 is urged against its stop member 34 by spring 54 through the intermediary of tubular member 44.

The wall between the pressure chamber 26 and the interior of reservoir 24 is formed with a threaded opening 60 which receives a one-way check valve assembly generally indicated by reference numeral 62. While the illustrated version of the present invention discloses the use of a threaded connection between said valve assembly 62 and opening 60, it is to be understood that any suitable connection may be used. Further, if desired, the opening 60 may be reduced in size to itself serve as the compensating port.

Valve assembly 62 as illustrated includes a plug 64 received in opening 60 in such a manner as to prevent leakage of fluid between the reservoir 24 and pressure chamber 26. To insure against leakage, an annular sealing member 66 is fitted between plug 64 and the outer edge of opening 69. Plug 64 is provided with an axially disposed compensating port 68, which is tapered to open with its widest portion into reservoir 24. This widest portion is preferably flared abruptly outwardly at 70 to form a spring retaining seat for a purpose to be explained hereinafter. Port 68 receives therethrough valve stem 72, having a diameter somewhat smaller than the smallest diameter of port 68. A cup-shaped retainer 74 is secured to the lower portion of valve stem 72 by any suitable means to carry a rubber (or like material) annulus 78, which has a raised seating portion 79. The lower end 76 of the valve stem 72 is engageable, as shown, with a flange 48 on tubular member 44. This raised portion 79 is adapted to engage the underside of plug 64 adjacent the peripheral area around port 68 to close said port 68 and prevent fluid from communicating between the master cylinder 26 and the reservoir 24. Secured on the upper end of valve stem 72 by any suitable means is a spring retaining member 80 which, in cooperation with spring retaining seat 70, serves to hold the frusto-conical compression spring 82 in place. This spring 82 constantly urges the annulus or valve 78 to close port 68, and said spring exerts a rotational force on stem 72 about the contact point of said stem with the wall of port 68 when valve 78 is tilted to its illustrated position. This rotational feature is especially desirable since it substantially eliminates any frictional contact between the stem 72 and any other structure which would tend to wedge or "stick" the valve 78 in open position. As is apparent from the drawing, the only probable place where this frictional contact could exist is the aforementioned point of contact between stem 72 and the wall of port 68; however, since substantially no sliding takes place at this fulcrum of contact because of the rotational force exerted by spring 82 on the upper end of stem 72, the frictional resistance to the seating of valve 78 is at a minimum. This feature is especially conducive to a reliable and efficient operation of the brake system.

The residual valve assembly 56 is a double-acting valve which serves to maintain a certain predetermined fluid pressure in the brake system. It comprises a mushroom valve element 84 having a stem 86 upon the end of which is secured a spring retaining disc 88, and an annular valve element 90 which serves as a valve seat for valve 84 as well as a closure against passage of fluid from pressure chamber 26 to the brakes. A light spring 92 is compressed between the retaining disc 88 and annular valve 90 to urge valve 84 to its illustrated seated position. Upon increasing the pressure in pressure chamber 26 due to depression of brake pedal 12, the valve 84 is unseated to permit the passage of pressure fluid to the brakes. Removal of this pressure in pressure chamber 26 permits valve 84 to return to its seat under the load of spring 92, and causes valve 90 to unseat against the load of spring 54 to allow the escape of pressure fluid from the brakes into pressure chamber 26. In actual operation, the protractile stroke of piston 28 forces valve 84 open while its retractile stroke closes valve 84 and permits valve 90 to open under the influence of the pressure fluid in the brakes. The force exerted by spring 54 upon valve 90 will determine the moment of closure of this valve and the consequent residual pressure in the brakes and associated lines, this residual pressure being somewhat above atmospheric pressure to prevent the entrance of air into the system.

The master cylinder piston is illustrated in its retracted position with the flange 48 of tubular member 44 engaging extension 76 of valve stem 72 to drop one side of valve 78 to establish through port 68 communication between reservoir 24 and pressure chamber 26. Thus the pressure chamber 26 will be supplied with liquid from reservoir 24.

In operation, depression of pedal 12 will cause protractile movement of piston 28 thereby allowing valve 78 to seal port 68 under the load of valve spring 82. Further depression of pedal 12 then results in the creation of pressure in pressure chamber 26 ahead of piston 28 which acts to more tightly close valve 78, unseat valve 84 and the consequent application of brakes 18.

When the pressure on 12 is released, the brake return springs 20 will urge the wheel cylinder pistons to released position, forcing fluid pressure from the lines into chamber 26, against the resistance of spring 54 acting on valve 90, at the same time spring 54 urges piston 28 toward released position. If the retractile movement of piston 28 at any time causes the pressure in chamber 26 to be reduced below atmospheric pressure, the compensating valve 78 will open to permit fluid in reservoir 24 to flow into the chamber 26 to stabilize the pressure. As piston 28 nears its fully retracted position, the flange 48 on tube 44 picks up the valve stem extension 76 to tilt or unseat valve 78 thereby opening port 68. If there is less fluid in pressure chamber 26 at this time than prevailed therein at the beginning of the protractile motion of piston 28, the deficiency will be replenished as explained above by fluid from reservoir 24 passing through open port 68.

As is obvious from the preceding description, the arrangement of the present invention permits fluid to flow from the reservoir into the brake system to take the place of any fluid which might have escaped, and also to compensate for contraction and expansion of fluid in the system due to temperature variations.

As explained previously, the compensating valve assembly 62 possesses the advantage of reliability over former valves of this type obviating the tendency of the compensating valve to cock or tilt and become wedged between the guiding wall of the companion recess and one side of the valve seat, thereby permanently opening the high pressure side of the system to atmospheric pressure, resulting in absolute failure of the system.

Although this invention has been described in connection with a certain specific embodiment, the principles are susceptible of numerous other applications that will readily occur to persons skilled in the art.

I claim:

1. For use in a liquid pressure producing device comprising a hydraulic cylinder having a pressure chamber which is provided at one end with a discharge port, a liquid-displacing member in the cylinder, a valve-controlling member on the liquid-displacing member, a reservoir mounted above the hydraulic cylinder and having a threaded opening communicating with said pressure chamber, compensating valve means comprising a plug received in said opening and having a frusto-conically shaped compensating port which has its widest portion opening into said reservoir, a valve assembly associated with said port comprising a stem extending therethrough, said stem and port being sized to provide a relatively loose fit, a valve member carried by said stem to selectively open and close the pressure chamber side of said port, said stem projecting beyond said valve member, in one direction, to extend into said pressure chamber and, in the other direction, to extend into said reservoir, a spring-retaining member carried on the reservoir end of said stem, and a compression spring engaging said spring-retaining member to urge said valve member to close said port, the portion of said stem which extends into said pressure chamber adapted to be engaged by the valve-controlling member during the final portion of the retractile stroke of said liquid-displacing member to tilt said valve member away from seated position.

2. For use in a liquid pressure producing device comprising a hydraulic cylinder having a pressure chamber which is provided at one end with a discharge port, a liquid-displacing member in the cylinder, a valve-controlling member on the liquid-displacing member, a reservoir mounted above the hydraulic cylinder and having an opening communicating with said pressure chamber, compensating valve means comprising a plug having a compensating port threadedly received in said opening, a valve assembly associated with said port comprising a stem extending therethrough, said stem and port being sized to provide a relatively loose fit, a valve member carried by said stem to selectively open and close the pressure chamber side of said port, said stem projecting beyond said valve member, in one direction, to extend into said pressure chamber and, in the other direction, to extend into said reservoir, a spring-retaining member carried on the reservoir end of said stem, and a compression spring engaging said spring-retaining member to urge said valve member to close said port, the portion of said stem which extends into said pressure chamber adapted to be engaged by the valve-controlling member during the final portion of the retractile stroke of said liquid-displacing member to tilt said valve member off its seat.

3. For use in a fluid pressure producing device including a pressure chamber having a fluid-displacing plunger and a discharge outlet, and a fluid replenishing reservoir having a port which opens into the pressure chamber; a valve assembly comprising a valve stem extending through said port substantially parallel to the axis thereof, a valve member on the pressure chamber side of said port carried intermediate the ends of said stem and arranged when seated to prevent flow of fluid from the pressure chamber to the reservoir, a spring-retaining member carried by the portion of the valve stem disposed on the reservoir side of said port, and a spring acting on said spring-retaining member to urge said valve member toward seated position, the portion of said stem on the pressure chamber side of said port being adapted to be moved transversely by the fluid-displacing plunger during the final portion of said plunger's retractile stroke to tilt said valve member from its seat and thereby establish communication between the pressure chamber and the reservoir.

4. For use in a fluid pressure producing device including a pressure chamber having a fluid-displacing plunger and a discharge outlet, and a fluid replenishing reservoir having a port which opens into the pressure chamber; a valve assembly comprising a valve stem extending through said port substantially parallel to the axis thereof, a valve member on the pressure chamber side of said port carried intermediate the ends of said stem and arranged when seated to prevent flow of fluid from the pressure chamber to the reservoir, a resilient member associated with the reservoir end of said stem arranged to urge said valve member toward seated position, the portion of said stem on the pressure chamber side of said port being adapted to be moved transversely by the fluid-displacing plunger during the final portion of said plunger's retractile stroke to tilt said valve member from its seat and thereby establish communication between the pressure chamber and the reservoir.

5. A one way check valve assembly actuated by means of force applied to the end of a valve stem to tilt a valve off its seat for controlling the flow of liquid between a hydraulic master cylinder including a piston and its compensating reservoir comprising a plug member provided with a centrally disposed opening, a valve seat on one side of said opening, the opening flaring outwardly at the other side of the plug so that the opening includes a relatively narrow wall portion adjacent said valve seat, a valve stem having ends extending through and beyond each side of said opening substantially at right angles to a plane containing said valve seat, said stem having a cross-sectional size less than that of the opening through which it passes permitting a predetermined lateral movement of said stem in said opening and permitting tilting of said stem against the narrow wall portion, a valve member carried intermediate the ends of said valve stem and engaging said valve seat for limiting the flow of liquid to one direction through said opening, a spring-retaining member carried by the end of said stem disposed on the side of the plug opposite said valve seat, and a spring interposed between the spring retaining member and the side of the plug opposite said valve seat, urging the valve member toward its seated position and urging the valve stem toward a right angle position with respect to the plane containing the valve seat, the end of the valve stem on the same side as said valve seat and extending therebeyond being arranged for operative engagement by the master cylinder piston to thereby cause the valve stem to pivot about the relatively narrow wall portion of the opening in the plug member.

6. A one way check valve assembly actuated by means of force applied to the end of a valve stem to tilt a valve off its seat for controlling the flow of liquid between a hydraulic master cylinder including a piston and its compensating reservoir comprising a partition member provided with an opening adapted to communicate said master cylinder with said reservoir, a valve seat on one side of said opening, a valve stem extending through said opening and substantially perpendicular to a plane containing said valve seat, the opposite ends of said stem projecting beyond the valve seat and beyond both sides of said partition member, the cross section of that portion of the stem adjacent the valve seat being of such an area as compared to the area of said opening through which the stem passes as to allow lateral movement in said opening as a result of tilting of said stem against the wall of said opening, a valve member carried by said stem and operatively associated with said valve seat for restricting flow of liquid to one direction through said opening, and a resilient member located on the side of the partition opposite said valve seat and operatively connected to the end of the stem projecting through said side for urging said valve member toward its seat and for positioning said stem at substantially a right angle with respect to the aforementioned plane of said valve seat, the end of the valve stem on the same side as said valve seat and extending therebeyond being arranged for operative engagement by the master cylinder piston to cause said valve stem to tilt within the opening and unseat said valve.

7. For use in a liquid pressure producing device comprising a hydraulic cylinder having a pressure chamber which is provided at one end with a discharge port, a liquid-displacing member in the cylinder, a reservoir mounted above the hydraulic cylinder and having a port which opens into the hydraulic pressure chamber, compensating valve means comprising a valve stem adapted to extend through the port at right angles to the axis of the hydraulic pressure chamber, a valve member adapted to be disposed in the hydraulic cylinder and carried by the valve stem and arranged when seated to prevent flow of liquid from the hydraulic pressure chamber to the reservoir, a spring-engaging flange carried by the portion of the valve stem which is arranged to be disposed inside the reservoir, a compression spring adapted to be located inside the reservoir and to act on said flange to urge the valve member toward seated position, and an extension on the valve stem adapted to be moved angularly by said liquid-displacing member during the final portion of its retractile stroke to lift one side of the valve member from its seat and thereby establish communication between the hydraulic pressure chamber and the reservoir.

8. For use in a fluid pressure-producing device including a hydraulic master cylinder having a fluid-displacing member movable therein and a fluid-compensating reservoir associated therewith, a one-way check valve assembly comprising a member adapted to be interposed between the reservoir and master cylinder and provided with a frusto-conically shaped compensating port, a valve seat surrounding said port and provided on said member on the side opposite the widest portion of said port, a valve stem extending through and beyond said port substantially at right angles to the plane of said seat and having a cross-sectional size which will allow a predetermined lateral movement and initial fulcruming of said stem against one edge of said port, a valve element carried intermediate the ends of said stem and adapted to engage said valve seat to limit the flow of liquid to one direction through said port, a spring-retaining member carried by the portion of said stem disposed on the side of said port opposite said valve seat, and a spring acting on said spring-retaining member to urge said valve element toward seated position, that portion of the valve stem extending beyond said port being engageable by said fluid-displacing member to tilt said valve element from its seat.

9. For use in a fluid pressure-producing device including a hydraulic master cylinder having a fluid-displacing member movable therein and a fluid-compensating reservoir associated therewith, a one-way check valve assembly comprising a member adapted to be interposed between the reservoir and master cylinder and provided with an opening, a valve seat formed on one side of said opening, a valve stem extending through and beyond said opening substantially at right angles to the plane of said valve seat and arranged to be reciprocated and fulcrumed against one side of said opening, a valve member carried intermediate the ends of said stem adapted to engage said valve seat to limit the flow of liquid to one direction through said opening, said valve member being capable of tilting to allow the passage of liquid in said one direction, and a resilient member associated with the portion of said stem disposed on the side of said opening opposite said valve seat urging said valve member toward seated position, that portion of the valve stem extending beyond said port being engageable by said fluid-displacing member to tilt said valve element from its seat.

10. For use in a fluid pressure-producing device including a hydraulic master cylinder having a fluid-displacing member movable therein and a fluid-compensating reservoir associated therewith, a one-way check valve assembly comprising a member adapted to be interposed between the reservoir and master cylinder and provided with an opening, a valve seat formed on one side of said opening, a valve supporting element extending through and beyond said opening and being arranged to tilt about one side of said opening as a fulcrum, a valve member carried by said supporting element and arranged to engage said valve seat to limit the flow of liquid to one direction through said opening, said valve member being capable of tilting on said valve seat to allow the passage of liquid in said one direction, and a resilient member associated with the portion of said stem disposed on the side of said opening opposite said valve seat urging said valve member toward seated position, that portion of the valve stem extending beyond said port being engageable by said fluid-displacing member to tilt said valve element from its seat.

References Cited in the file of this patent

UNITED STATES PATENTS

| Number | Name | Date |
| --- | --- | --- |
| 481,727 | Gold | Aug. 30, 1892 |
| 725,015 | Zehnder | Apr. 7, 1903 |
| 1,630,362 | Sutton | May 31, 1927 |
| 2,000,187 | Oliver | May 7, 1935 |
| 2,134,509 | Frank | Oct. 25, 1938 |
| 2,136,221 | Sloan | Nov. 8, 1938 |
| 2,203,082 | Dick | June 4, 1940 |
| 2,229,213 | Kubiliunas | Jan. 21, 1941 |
| 2,241,758 | Baldine | May 13, 1941 |
| 2,526,457 | Bradbury | Oct. 17, 1950 |
| 2,527,886 | LaBrie | Oct. 31, 1950 |
| 2,552,033 | Bradbury | May 8, 1951 |
| 2,552,048 | LaBrie | May 8, 1951 |

FOREIGN PATENTS

| Number | Country | Date |
| --- | --- | --- |
| 539,095 | Great Britain | Aug. 27, 1941 |
| 717,796 | Germany | Feb. 23, 1942 |
| 262,256 | Switzerland | Sept. 16, 1949 |